(12) United States Patent
Akahori

(10) Patent No.: US 10,981,501 B2
(45) Date of Patent: Apr. 20, 2021

(54) SOUND OUTPUT DEVICE AND SOUND OUTPUT SYSTEM

(71) Applicant: LAPIS SEMICONDUCTOR CO., LTD., Kanagawa (JP)

(72) Inventor: Hiroji Akahori, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/711,471

(22) Filed: Dec. 12, 2019

(65) Prior Publication Data

US 2020/0189458 A1 Jun. 18, 2020

(30) Foreign Application Priority Data

Dec. 13, 2018 (JP) .............................. JP2018-233604
Mar. 29, 2019 (JP) .............................. JP2019-069056

(51) Int. Cl.
*G08B 21/00* (2006.01)
*B60Q 5/00* (2006.01)

(52) U.S. Cl.
CPC .............. *B60Q 5/008* (2013.01); *B60Q 5/006* (2013.01)

(58) Field of Classification Search
CPC ......... B60Q 5/006; B60Q 5/008; G01S 15/18; G01S 15/931; G05B 13/028; G05B 19/042; G05B 19/4183; G05B 19/4184; G05B 19/41845; G05B 19/4185; G05B 19/41865; G05B 19/41875; G05B 2219/32287; G05B 2219/35001; G05B 2219/37337; G05B 2219/37351; G05B 2219/37434; G05B 2219/40115; G05B 2219/45004; G05B 2219/45129; G05B 23/0221; G05B 23/0229; G05B 23/024; G05B 23/0264; G05B 23/0283; G05B 23/0286; G05B 23/0289; G05B 23/0291; G05B 23/0294; G05B 23/0297; G05D 1/0244; G05D 1/0265; G06K 9/6263; G06N 20/00; G06N 3/006; G06N 3/02; G06N 3/0445; G06N 3/0454; G06N 3/0472; G06N 3/084;
(Continued)

(56) References Cited

U.S. PATENT DOCUMENTS 7,135,961 B1 * 11/2006 Operowsky ........ G01C 21/3629
340/425.5
7,979,147 B1 * 7/2011 Dunn ..................... G10K 15/02
700/94
(Continued)

FOREIGN PATENT DOCUMENTS

JP 2013-205478 A 10/2013

*Primary Examiner* — Daniel Previl
(74) *Attorney, Agent, or Firm* — Volentine, Whitt & Francos, PLLC

(57) ABSTRACT

A sound output device for installation at a vehicle is provided with a warning sound generation section configured to generate a warning sound including at least one sine wave, a background sound generation section configured to generate a volume-adjusted first background sound based on a selected sound source, a controller configured to control selection of a sound source of the first background sound based on externally-supplied selection information, and a first synthesizer section configured to combine the warning sound and the first background sound and output the combination as a first advisory sound.

6 Claims, 8 Drawing Sheets

(58) Field of Classification Search
CPC ........ G06N 3/088; G06N 3/126; G06N 5/046;
G06N 7/005; G06Q 30/02; G06Q 30/06;
H04B 17/23; H04B 17/26; H04B 17/29;
H04B 17/309; H04B 17/318; H04B
17/345; H04B 17/40; H04L 1/0002;
H04L 1/0009; H04L 1/0041; H04L 1/18;
H04L 1/1874; H04L 5/0064; H04L
67/1097; H04L 67/12; H04L 67/306;
H04W 4/38; H04W 4/70; Y02P 80/114;
Y02P 90/02
USPC ....... 340/425.5, 980, 990, 995, 995.1, 995.2
See application file for complete search history.

(56) References Cited

U.S. PATENT DOCUMENTS

| | | | |
|---|---|---|---|
| 2009/0189458 A1* | 7/2009 | Kawasaki | H02J 50/80 307/104 |
| 2012/0182136 A1* | 7/2012 | Nakayama | B60Q 5/008 340/425.5 |
| 2014/0350927 A1* | 11/2014 | Yamabe | G10L 25/48 704/233 |
| 2014/0363019 A1* | 12/2014 | Funahashi | B60R 13/005 381/86 |
| 2016/0366516 A1* | 12/2016 | Tanaka | H03F 3/181 |
| 2019/0158970 A1* | 5/2019 | Konno | H03G 3/3005 |

\* cited by examiner

FIG.3

| SPEED INFORMATION | SINE WAVE CONTROL SIGNAL | | | | | | | SOUND SOURCE CONTROL SIGNAL | |
|---|---|---|---|---|---|---|---|---|---|
| | FIRST SINE WAVE | | SECOND SINE WAVE | | THIRD SINE WAVE | | ... | FREQUENCY SCALING FACTOR | MAXIMUM VOLUME |
| | FREQUENCY | VOLUME | FREQUENCY | VOLUME | FREQUENCY | VOLUME | | | |
| v1 | f11 | L11 | — | — | — | — | ... | n1 | Lmax1 |
| v2 | f21 | L21 | f22 | L22 | — | — | ... | n2 | Lmax2 |
| v3 | f31 | L31 | f32 | L32 | f33 | L33 | ... | n3 | Lmax3 |
| ... | ... | ... | ... | ... | ... | ... | ... | ... | ... |

FIG.4

| ID | SOUND SOURCE SIGNAL |
|---|---|
| 1 | Sound1 |
| 2 | Sound2 |
| 3 | Sound3 |
| ... | ... |

| ID | SOUND SOURCE SIGNAL | VOLUME LEVEL |
|---|---|---|
| 1 | Sound1 | L1 |
| 2 | Sound2 | L2 |
| 3 | Sound3 | L3 |
| ... | ... | ... |

SOUND OUTPUT DEVICE AND SOUND OUTPUT SYSTEM

CROSS-REFERENCE TO RELATED APPLICATION

This application claims priority under 35 USC 119 from Japanese Patent application No. 2018-233604 filed on Dec. 13, 2018, and Japanese Patent application No. 2019-069056 filed on Mar. 29, 2019, and the disclosures of which are incorporated by reference herein in their entireties.

BACKGROUND

Technical Field

The present disclosure relates to a sound output device and a sound output system, and in particular relates to a sound output device for installation at a moving body.

Related Art

Since hybrid vehicles and electric vehicles are very quiet when driving, a practice is known whereby such vehicles are installed with speakers to output an advisory sound to alert pedestrians for the approach of the vehicle. Such advisory sounds need to catch the attention of the pedestrian by emitting a sound that is consistent between the various hybrid vehicles and electric vehicles. Individual countries impose their own restrictions and regulations regarding the frequency and volumes of such sounds.

For example, the technology disclosed in Japanese Patent Application Laid-Open (JP-A) No. 2013-205478 shifts the frequencies of plural frequency components of an advisory sound configured by the plural frequency components according to vehicle speed, and also changes the volumes of the respective shifted frequencies.

The ability to change the advisory sound depending on the preferences of a user is desirable. However, advisory sounds are subject to the restrictions and regulations mentioned above.

SUMMARY

The present disclosure provides a sound output device and sound output system capable of outputting a sound adapted to suit the tastes of a user while also taking safety into account by generating and outputting both a sound that can be modified by the user and sound that cannot be modified by the user.

A sound output device according to a first aspect of the present disclosure is a sound output device for installation at a vehicle. The sound output device includes a warning sound generation section configured to generate a warning sound including at least one sine wave, a background sound generation section configured to generate a volume-adjusted first background sound based on a selected sound source, a controller configured to control selection of a sound source of the first background sound based on externally-supplied selection information, and a first synthesizer section configured to combine the warning sound and the first background sound and output the combination as a first advisory sound.

The present disclosure is capable of outputting a sound adapted to suit the tastes of a user while also taking safety into account by generating and outputting both a sound that can be modified by the user and sound that cannot be modified by the user.

BRIEF DESCRIPTION OF THE DRAWINGS

Exemplary embodiments of the present disclosure will be described in detail based on the following figures, wherein:

FIG. 3 is a diagram illustrating an example of information stored in speed-based control information memory according to the first exemplary embodiment;

FIG. 4 is a diagram illustrating an example of information stored in sound source memory according to the first exemplary embodiment;

DETAILED DESCRIPTION

Figure 1:
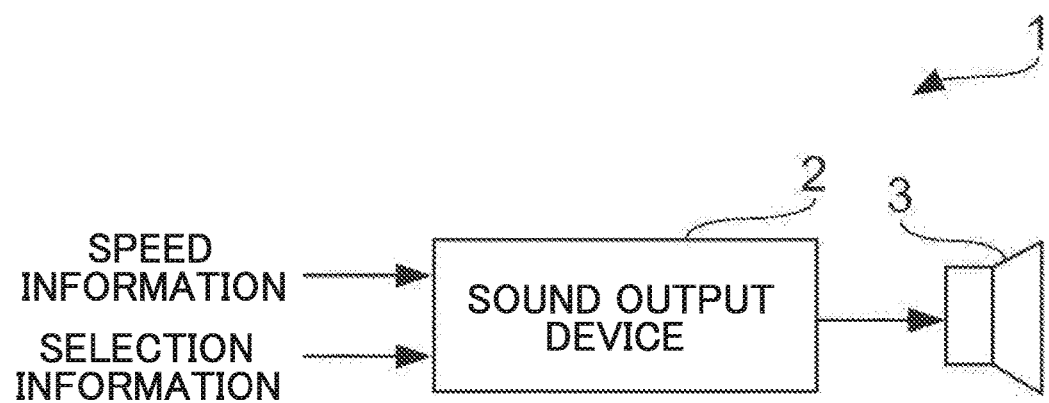
FIG. 1 is a block diagram illustrating an example of configuration of a sound output system according to a first exemplary embodiment.

Explanation follows regarding exemplary embodiments of the present disclosure, with reference to the drawings. Identical or equivalent configuration elements are annotated with the same reference numerals in each of the drawings.

First Exemplary Embodiment

First, explanation follows regarding a sound output system 1 according to an exemplary embodiment, with reference to FIG. 1. As illustrated in FIG. 1, the sound output system 1 of the present exemplary embodiment includes a sound output device 2 and a first speaker 3. The sound output system 1 is, for example, installed at a vehicle such as a hybrid vehicle or an electric vehicle.

As illustrated in FIG. 1, the sound output device 2 is input with information relating to vehicle speed (this information is referred to hereafter as speed information), and information relating to a sound source signal selected by a user from at least one sound source signal stored in a sound source memory 207, described later (this information is referred to hereafter as selection information). The sound output device 2 outputs a first advisory sound, described later, to a first speaker 3, and the first speaker 3 emits the first advisory sound toward the vehicle exterior.

In the sound output device 2 according to the present exemplary embodiment, as an example a circuit for producing a sound specified under vehicle approach advisory regulations (referred to hereafter as a warning sound) and a circuit for producing a sound that can be freely selected by a user (referred to hereafter as a background sound) are mounted in a single chip. The warning sound and the background sound are combined and output as the first advisory sound. Namely, a sound that can be freely selected by the user is combined as a background sound for the warning sound that cannot be modified by the user, and this combination is output as the first advisory sound. The sound output device 2 is, for example, configured by a single semiconductor integrated circuit, in other words by a single chip.

Figure 2:
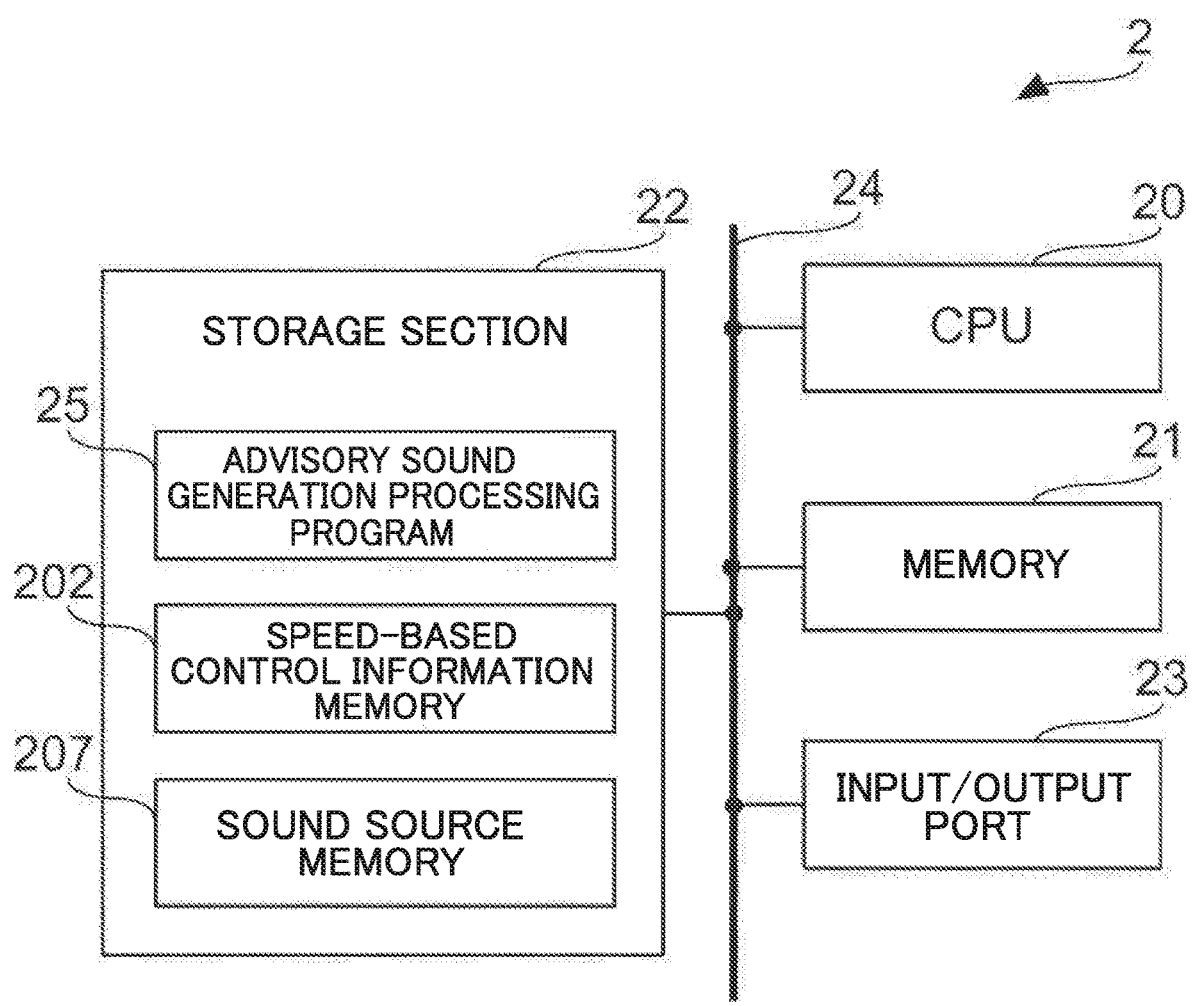
FIG. 2 is a block diagram illustrating an example of a hardware configuration of a sound output device according to the first exemplary embodiment.

Explanation follows regarding a hardware configuration of the sound output device 2 according to the present exemplary embodiment, with reference to FIG. 2. As illustrated in FIG. 2, the sound output device 2 includes a Central Processing Unit (CPU) 20, memory 21 serving as a temporary storage region, a non-volatile storage section 22, and an input/output port 23. The CPU 20, the memory 21, the storage section 22, and the input/output port 23 are each connected to a bus 24.

The storage section 22 is implemented by a non-volatile storage medium such as a Hard Disk Drive (HDD), a Solid State Drive (SSD), flash memory, or the like. The storage section 22 serving as a storage medium is stored with an advisory sound generation processing program 25, speed-based control information memory 202, and sound source memory 207. The CPU 20 reads the advisory sound generation processing program 25 from the storage section 22 and expands the advisory sound generation processing program 25 in the memory 21, and then executes the expanded advisory sound generation processing program 25.

FIG. 3 illustrates an example of information stored in the speed-based control information memory 202. The information stored in the speed-based control information memory 202 is, for example, information specified by vehicle approach advisory regulations. As illustrated in FIG. 3, the speed-based control information memory 202 is stored with sine wave control signals, described later, each including a frequency f and volume L of at least one sine wave configuring a warning sound, stored corresponding to respective items of speed information v. The number of sine waves configuring each warning sound may differ depending on the speed information v. For example, a sine wave control signal corresponding to speed information v1 includes a single sine wave contained in the warning sound (namely, the warning sound includes a single frequency component), the frequency of this first sine wave being f11 and the volume thereof being L11. Moreover, for example, a sine wave control signal corresponding to speed information v2 includes two sine waves contained in the warning sound (namely, the warning sound contains two frequency components), a first sine wave thereof having a frequency of f21 and a volume of L21, and a second sine wave thereof having a frequency of f22 and a volume of L22.

Moreover, as illustrated in FIG. 3, the speed-based control information memory 202 is also stored with sound source control signals, described later, each including a first background sound frequency scaling factor n and a maximum volume Lmax of a first sound source signal, stored corresponding to the respective items of the speed information v. For example, the sound source control signal corresponding to the speed information v1 represents a frequency scaling factor of n1 and a maximum volume of Lmax1 for a first background sound corresponding to the first sound source signal.

FIG. 4 illustrates an example of information stored in the sound source memory 207. For example, the sound source memory 207 is stored with at least one sound source signal that can be freely selected by the user. As illustrated in FIG. 4, the sound source memory 207 is stored with sound source signals associated with identifiers (IDs), serving as an example of sound source identification information. Note that the sound source signals may be configured by uncompressed audio data, or may be configured by compressed audio data.

Figure 5:
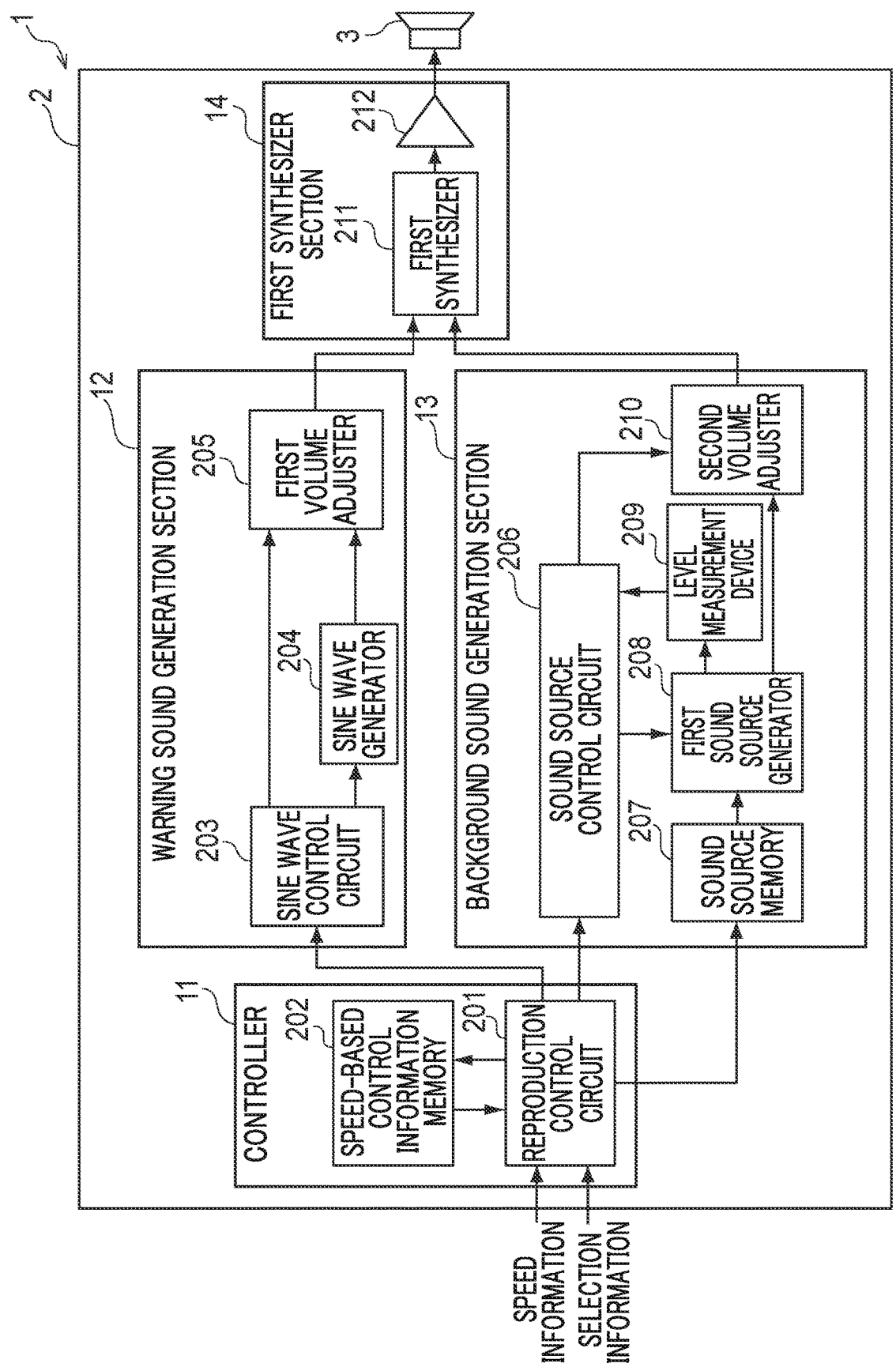
FIG. 5 is a block diagram illustrating an example of functional configuration of a sound output device according to the first exemplary embodiment.

Explanation follows regarding functional configuration of the sound output device 2 according to the present exemplary embodiment, with reference to FIG. 5. As illustrated in FIG. 5, the sound output device 2 includes a controller 11, a warning sound generation section 12, a background sound generation section 13, and a first synthesizer section 14. The CPU 20 executes the advisory sound generation processing program 25 in order to function as the controller 11, the warning sound generation section 12, the background sound generation section 13, and the first synthesizer section 14.

The controller 11 controls selection of the sound source of the first background sound based on externally-supplied selection information. The controller 11 may also control to select one sound source signal from out of the at least one sound source signal stored in the sound source memory 207 based on the selection information. The controller 11 may also supply a sine wave control signal including an instruction relating to the frequency of the sine wave included in the warning sound and relating to the volume of the warning sound to the warning sound generation section 12 based on the speed information, and supply a sound source control signal including an instruction relating to the frequency and volume of the first background sound to the background sound generation section 13 based on the speed information.

The warning sound generation section 12 generates a warning sound including at least one sine wave. Namely, the at least one sine wave is at least one sine wave stored in the speed-based control information memory 202.

The background sound generation section 13 generates a volume-adjusted first background sound based on the selected sound source. Namely, the selected sound source is at least one of the sound source signals stored in the sound source memory 207.

The first synthesizer section 14 combines the warning sound and the first background sound and outputs the combination as the first advisory sound.

Detailed explanation follows regarding the functionality of the controller 11, the warning sound generation section 12, the background sound generation section 13, and the first synthesizer section 14.

First, detailed explanation follows regarding the functionality of the controller 11. The controller 11 includes a reproduction control circuit 201 and the speed-based control information memory 202.

When the reproduction control circuit 201 is input with speed information v, the reproduction control circuit 201 references the speed-based control information memory 202 to acquire the frequency f and the volume L of the sine wave corresponding to the speed information v, and outputs a sine wave control signal including an instruction to generate a sine wave having the frequency f and the volume L to a sine wave control circuit 203.

When the reproduction control circuit 201 is input with the speed information v, the reproduction control circuit 201 references the speed-based control information memory 202 to acquire the frequency scaling factor n and the maximum volume Lmax corresponding to the speed information v, and outputs a sound source control signal including an instruction to generate a first background sound having the frequency scaling factor n relative to the first sound source signal and the maximum volume Lmax to a sound source control circuit 206. Note that the reproduction control circuit 201 may control at least one out of the frequency and volume of the first background sound generated by the background sound generation section 13.

When the reproduction control circuit 201 is input with the selection information, the reproduction control circuit 201 references the sound source memory 207 and outputs a sound source selection signal to the sound source memory 207. The sound source selection signal includes an instruction to output a sound source signal corresponding to the selection information (namely, the first sound source signal) to a first sound source generator 208.

Next, detailed explanation follows regarding the functionality of the warning sound generation section 12. The warning sound generation section 12 includes the sine wave control circuit 203, a sine wave generator 204, and a first volume adjuster 205. The sine wave control circuit 203 outputs a sine wave generation signal including an instruction to generate a sine wave having the frequency instructed by the sine wave control signal, and also outputs a first volume control signal including an instruction relating to the warning sound volume as instructed by the sine wave control signal. The sine wave generator 204 outputs a sine wave based on the sine wave generation signal. The first volume adjuster 205 adjusts the volume of the warning sound based on the first volume control signal.

The sine wave generation signal output to the sine wave generator 204 by the sine wave control circuit 203 based on the sine wave control signal includes an instruction to generate a sine wave having the frequency f. The first volume control signal output to the first volume adjuster 205 by the sine wave control circuit 203 based on the sine wave control signal includes an instruction to adjust the volume of a sine wave signal, described later, to the volume L. Note that in cases in which the sine wave control signal instructs the generation of plural sine waves, the sine wave control circuit 203 outputs a sine wave generation signal and a first volume control signal for each of these sine waves.

The sine wave generator 204 generates a sine wave with the frequency f based on the sine wave generation signal, and outputs the generated sine wave (referred to hereafter as the sine wave signal) to the first volume adjuster 205. Note that in cases in which the sine wave generation signal instructs the generation of plural sine waves, the sine wave generator 204 outputs a sine wave signal for each of these sine waves.

The first volume adjuster 205 adjusts the volume of the sine wave signal based on the first volume control signal, and outputs the volume-adjusted sine wave signal to the first synthesizer 211 as a warning sound. Note that in cases in which the first volume control signal instructs volume adjustment of plural sine waves, the first volume adjuster 205 outputs a volume-adjusted sine wave signal for each of these sine waves as a warning sound.

Next, detailed explanation follows regarding the functionality of the background sound generation section 13. The background sound generation section 13 includes the sound source control circuit 206, the sound source memory 207, the first sound source generator 208, a level measurement device 209, and a second volume adjuster 210. The sound source control circuit 206 outputs a sound source generation signal including an instruction to generate a first background sound having the frequency instructed by the sound source control signal and also outputs a second volume control signal including an instruction to generate the first background sound at the volume instructed by the sound source control signal. The sound source memory 207 stores at least one sound source signal configuring the sound source of the first background sound. The first sound source generator 208 adjusts the frequency of the first background sound based on the sound source generation signal. The level measurement device 209 measures the level of the sound source signal configuring the sound source of the first background sound. The second volume adjuster 210 adjusts the volume of the first background sound such that it does not exceed a predetermined maximum volume. The second volume adjuster 210 may also adjust the volume of the first background sound based on a measurement result of the level measurement device 209. The second volume adjuster 210 may also adjust the volume of the first background sound based on the second volume control signal.

Variation may be present between levels of the sound source signals stored in the sound source memory 207. In cases in which the level of a signal configuring the sound source of the first background sound is high, the warning sound included in the first advisory sound emitted from the first speaker 3 may be drowned out by the background sound. It is thus necessary to ensure that the regulations are conformed to. Accordingly, the background sound generation section 13 uses the level measurement device 209 to measure the level of the sound source signal configuring the sound source of the first background sound, and based on the measurement result, uses the second volume adjuster 210 to adjust the level of the sound source signal configuring the sound source of the first background sound to within a range that will conform to the regulations. The background sound generation section 13 then outputs the result as the first background sound.

The sound source control circuit 206 outputs the sound source generation signal to the first sound source generator 208 based on the sound source control signal. The sound source generation signal includes an instruction to perform adjustment such that the frequency scaling factor of the first background sound becomes n times the first sound source signal. The sound source control circuit 206 outputs the second volume control signal to the second volume adjuster 210 based on the sound source control signal and a level signal, described later. The second volume control signal includes an instruction to adjust the volume of a first sound signal, described later, to within a range that does not exceed the volume Lmax.

The sound source memory 207 outputs the first sound source signal to the first sound source generator 208 based on the sound source selection signal.

The first sound source generator 208 adjusts the frequency of the first sound source signal based on the sound source generation signal such that the first sound source signal has the frequency scaling factor n times, and then outputs a frequency-adjusted sound signal (referred to hereafter as the first sound signal) to the level measurement device 209 and the second volume adjuster 210.

The level measurement device 209 measures the volume level of the first sound signal, and outputs a level signal corresponding to the measured level to the sound source control circuit 206. For example, the level measurement device 209 measures the level of the volume of the first sound signal as a numerical value relating to the sound pressure level (dB), amplitude (sound pressure) (Pa), acoustic power level (W), or sound strength (W/m$^2$) of the first sound signal.

Based on the second volume control signal, the second volume adjuster 210 adjusts the volume of the first sound signal to within a range that does not exceed the volume Lmax, and outputs the volume-adjusted first sound signal to the first synthesizer 211 as the first background sound. For example, the second volume adjuster 210 may adjust the volume of the first sound signal by compressing portions of the first sound signal where the volume exceeds the volume Lmax to the volume Lmax, or may adjust the volume of the first sound signal by compressing the entire first sound signal such that the maximum volume thereof becomes the volume Lmax.

Next, detailed explanation follows regarding functionality of the first synthesizer section 14. The first synthesizer section 14 includes a first synthesizer 211 and a first amplifier 212. The first synthesizer 211 combines the warning sound and the first background sound and outputs the combination to the first amplifier 212 as a first advisory sound. The first amplifier 212 outputs the first advisory sound to the first speaker 3.

Note that the sound source control circuit 206 may set the second volume control signal such that the first background sound is not produced by the first speaker 3 before the level of the volume of the first sound signal has been measured by the level measurement device 209. Moreover, the sound source control circuit 206 may control the volume of the first of repeated reproductions of the first background sound such that the volume is zero, while the level measurement device 209 measures the volume level of the first sound signal in the meantime.

Figure 6:
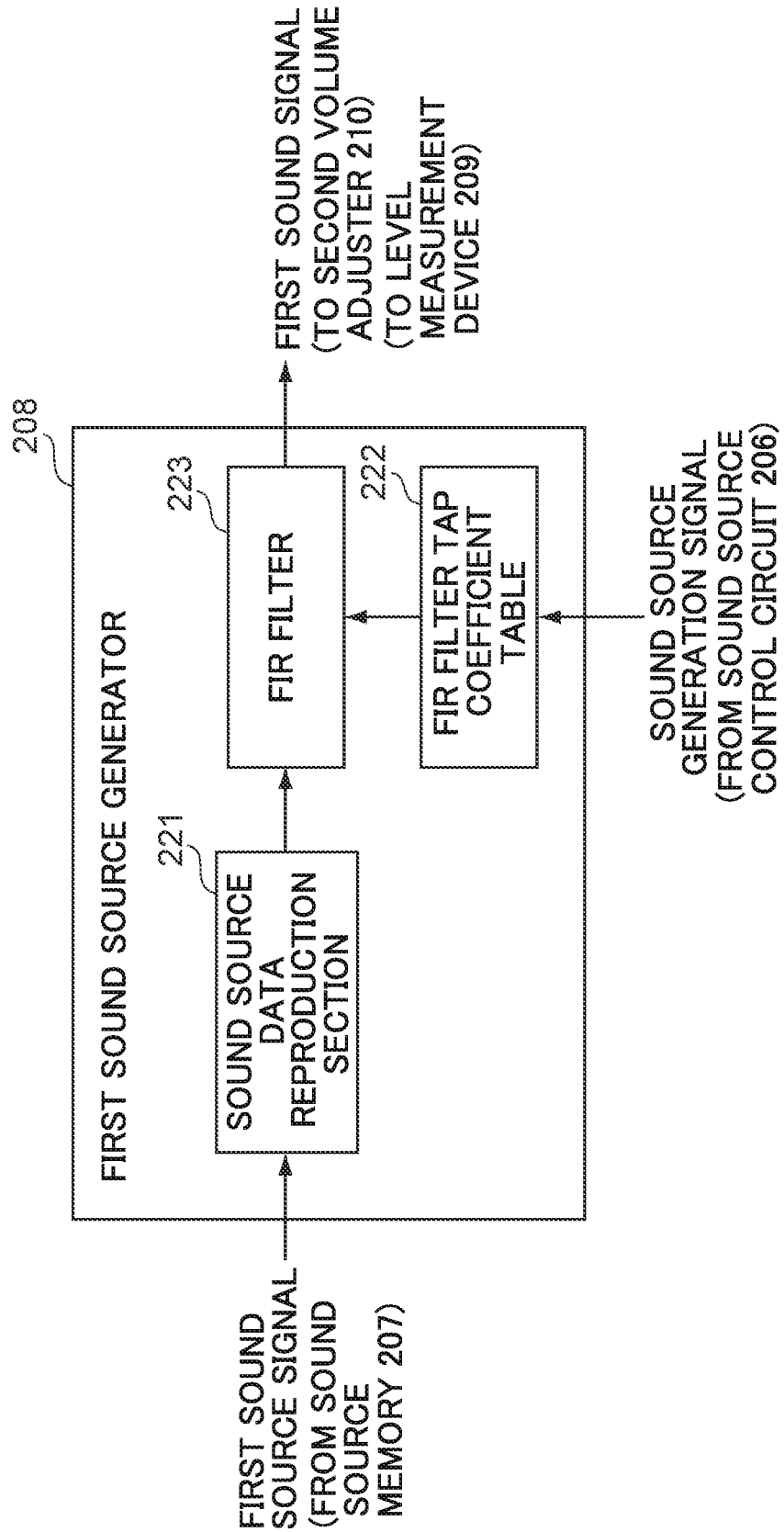
FIG. 6 is a block diagram illustrating an example of configuration of a first sound source generator according to the first exemplary embodiment.

FIG. 6 is a block diagram illustrating functional configuration of the first sound source generator 208. As illustrated in FIG. 6, the first sound source generator 208 is configured by a sound source data reproduction section 221, a FIR filter tap coefficient table 222, and a FIR filter 223.

The sound source data reproduction section 221 reproduces the input first sound source signal, and outputs the result to the FIR filter 223. Note that in cases in which the first sound source signal is configured by compressed audio data, the sound source data reproduction section 221 expands and then reproduces the first sound source signal.

The FIR filter tap coefficient table 222 determines a tap coefficient based on an input sound source generation signal such that the frequency of the first sound signal generated by the FIR filter 223 becomes n times the frequency of the first sound source signal.

The FIR filter 223 adjusts the frequency of the first sound source signal reproduced by the sound source data reproduction section 221 based on the tap coefficient determined by the FIR filter tap coefficient table 222.

Specifically, the FIR filter tap coefficient table 222 determines the tap coefficient such that a sampling timing of waveform data of the first sound source signal is matched to a sampling timing of waveform data of the first sound signal. Namely, the tap coefficient of the FIR filter 223 is not fixed, and is modified for each sampling timing.

Due to this configuration, in addition to outputting the waveform data of the sound source signal held in the sound source memory 207 as the first background sound as-is, the waveform of the sound source signal may be elongated or shortened along the time axis according to the speed information so as to raise or lower the frequency of the overall sound information.

As described above, the sound output device 2 according to the present exemplary embodiment generates the warning sound including at least one sine wave, and generates the volume-adjusted first background sound based on the selected sound source. Generating and outputting both a sound that can be modified by the user and a sound that cannot be modified by the user enables output of a sound that is adapted to suit the tastes of the user while also taking safety into account.

Note that there are cases in which the first background sound does not need to meet frequency stipulations set out under vehicle approach advisory regulations. In such cases, there is no need to adjust the frequency of the first sound source signal with the first sound source generator 208.

Configuration may be made such that in cases in which the level of the first sound signal as measured by the level measurement device 209 is below the maximum volume Lmax, the background sound generation section 13 does not adjust the volume, or increases the volume such that the maximum volume level of the first sound signal becomes Lmax.

Modified Example of First Exemplary Embodiment

Figure 7:
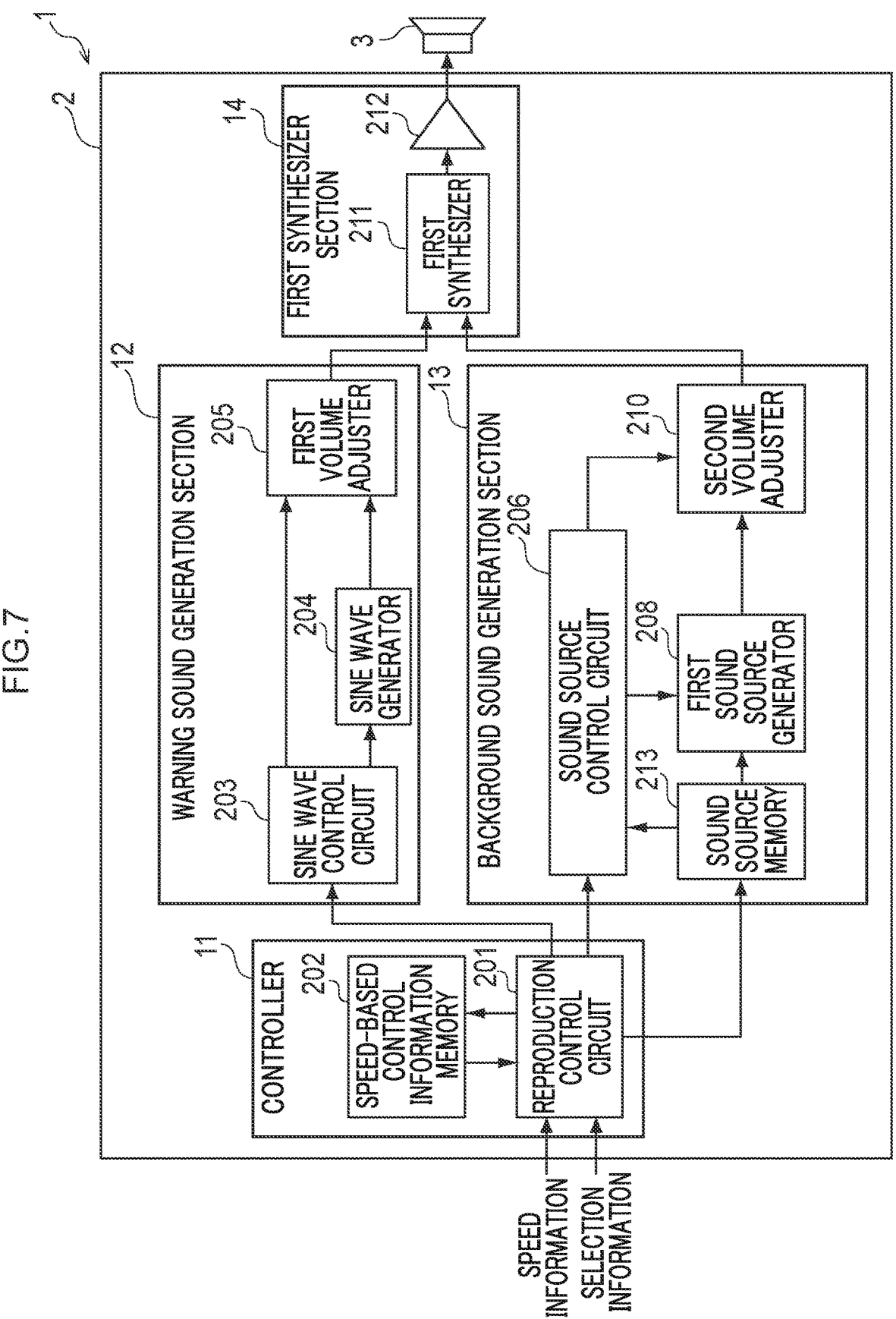
FIG. 7 is a block diagram illustrating an example of functional configuration of a sound output device according to a modified example of the first exemplary embodiment.

Explanation follows regarding a modified example of the first exemplary embodiment, with reference to FIG. 7. In the present modified example, the circuit configuration is simplified by omitting the level measurement device 209 of the first exemplary embodiment.

Figures 8, 9:
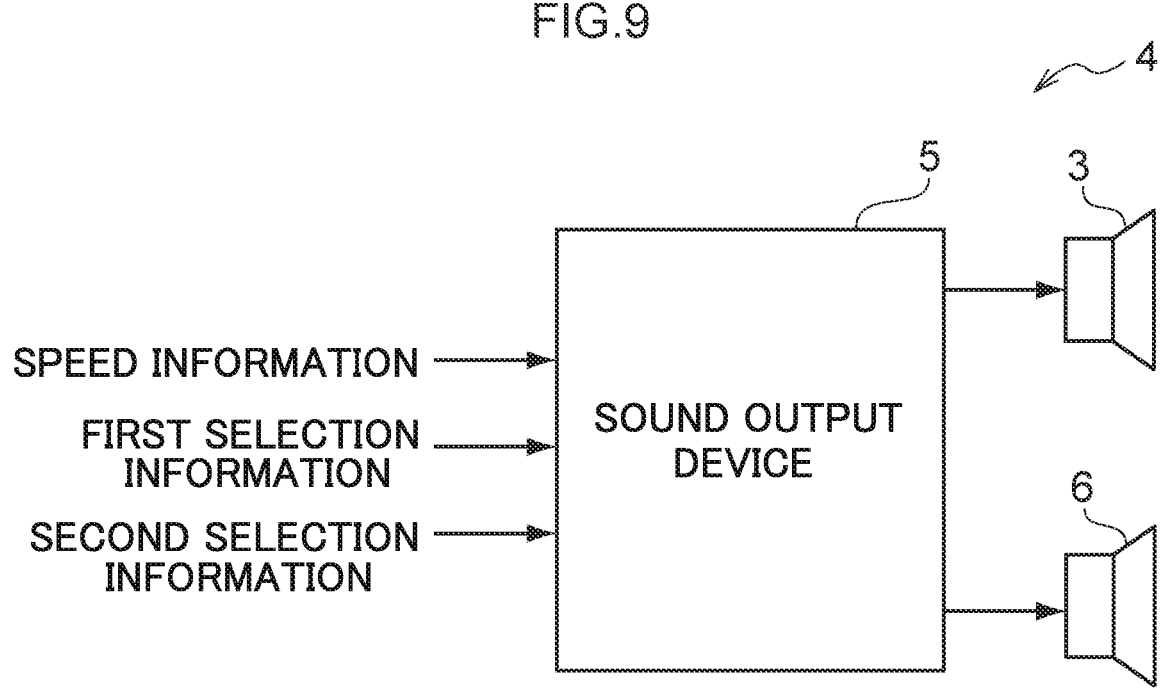
FIG. 8 is a diagram illustrating an example of information stored in sound source memory according to the modified example of the first exemplary embodiment.
FIG. 9 is a block diagram illustrating an example of configuration of a sound output system according to a second exemplary embodiment.

FIG. 8 illustrates an example of information included in a sound source memory 213 according to the present modified example. The sound source memory 213 is, for example, stored with one or more sound source signals that can be freely selected by the user, and volume level information corresponding to each of the sound source signals. The volume level is the maximum volume of the sound source signal as measured in advance using separate hardware or software, and is stored associated with the ID and the sound source signal.

The sound source control circuit 206 acquires the volume level information for each sound source signal from the sound source memory 213 instead of acquiring the level signal output from the level measurement device 209. The volume level information of the sound source signal is saved in advance in the sound source memory 213 together with the sound source signal, thereby enabling the volume to be adjusted to within a range that will conform to the regulations by a simpler method.

Second Exemplary Embodiment

A sound output device 5 according to a second exemplary embodiment outputs a second advisory sound in addition to the first advisory sound output by the sound output device 2 according to the first exemplary embodiment. The second advisory sound is, for example, a sound not subject to vehicle approach advisory regulations, such as a sound emitted from a speaker toward the vehicle interior. Namely, the second advisory sound does not need to conform to vehicle approach advisory regulations, and thus enables the degrees of freedom regarding the background sound to be increased. For example, a voice message may be delivered to an operator.

First, explanation follows regarding a sound output system 4 according to the present exemplary embodiment, with reference to FIG. 9. As illustrated in FIG. 9, the sound output system 4 according to the present exemplary embodiment includes the sound output device 5, a first speaker 3 and a second speaker 6. The sound output system 4 is, for example, installed at a vehicle such as a hybrid vehicle or an electric vehicle.

As illustrated in FIG. 9, the sound output device 5 is input with speed information, and information relating to a sound source signal selected by the user from out of at least one sound source signal stored in sound source memory 307 (see FIG. 10), described later (this information is referred to hereafter as first selection information). The sound output device 5 is also input with information relating to a sound source signal to be added to the second advisory sound only (this information is referred to hereafter as second selection information). The first selection information is information similar to the selection information of the first exemplary embodiment.

The sound output device 5 outputs the first advisory sound to the first speaker 3, and the first speaker 3 emits the first advisory sound toward the vehicle exterior. The sound output device 5 outputs the second advisory sound to the second speaker 6, and the second speaker 6 emits the second advisory sound toward the vehicle interior.

Figure 10:
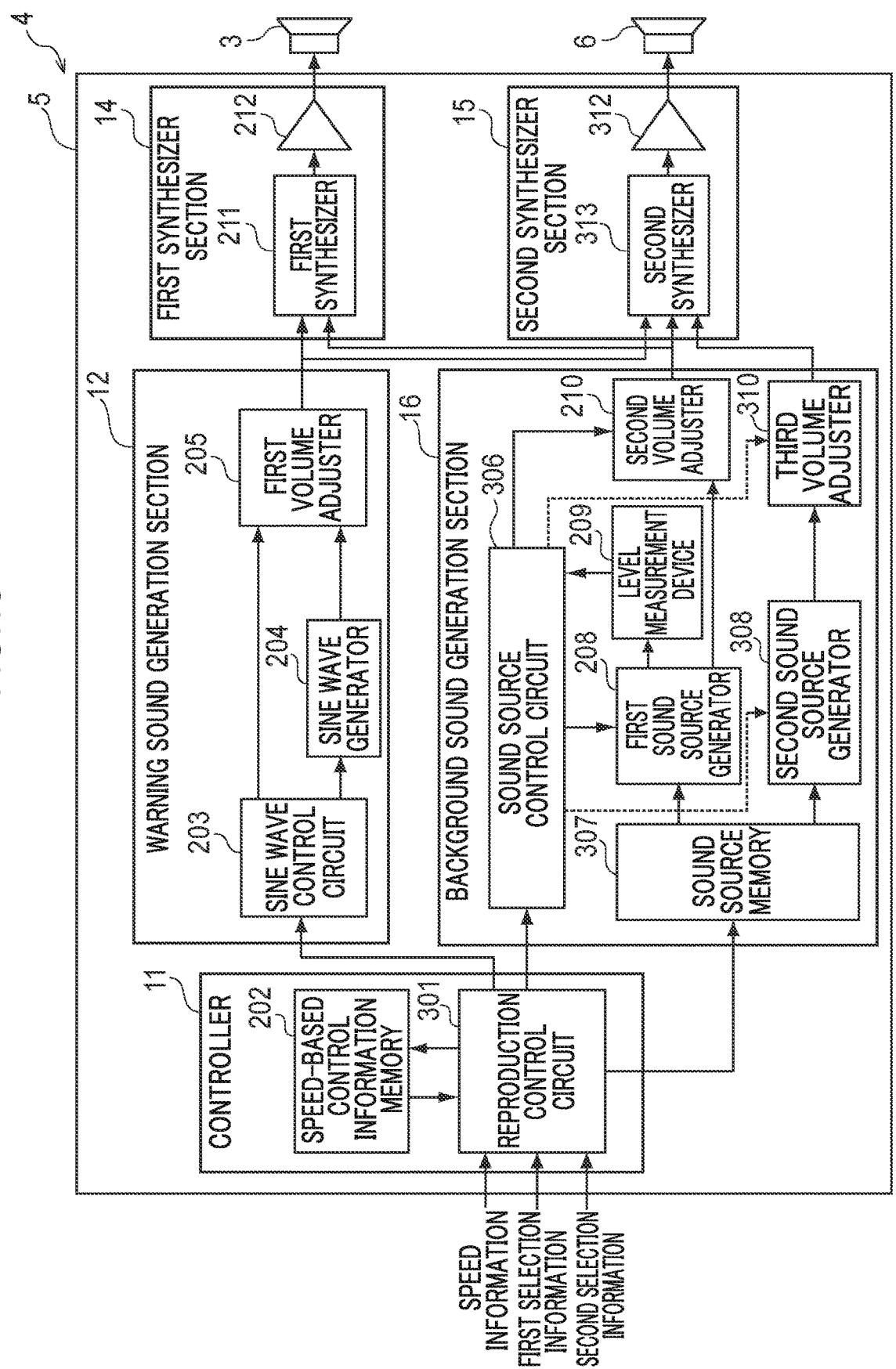
FIG. 10 is a block diagram illustrating an example of functional configuration of a sound output device according to the second exemplary embodiment.

Explanation follows regarding functional configuration of the sound output device 5 according to the present exemplary embodiment, with reference to FIG. 10. As illustrated in FIG. 10, the sound output device 5 includes a controller 11, a warning sound generation section 12, a background sound generation section 16, a first synthesizer section 14, and a second synthesizer section 15. The CPU 20 executes an advisory sound generation processing program 25 so as to function as the controller 11, the warning sound generation section 12, the background sound generation section 16, the first synthesizer section 14, and the second synthesizer section 15. The controller 11, the warning sound generation section 12, and the first synthesizer section 14 are configured similarly to in the first exemplary embodiment, and so explanation thereof is omitted.

The background sound generation section 16 generates a volume-adjusted first background sound and also generates a second background sound based on the selected sound sources. The second synthesizer section 15 combines the warning sound, the first background sound, and the second background sound, and outputs the combination as the second advisory sound.

Detailed explanation follows regarding functionality of the controller 11, the background sound generation section 16, and the second synthesizer section 15.

First, detailed explanation follows regarding functionality of the controller 11. The controller 11 includes a reproduction control circuit 301 and a speed-based control information memory 202. In addition to having the functionality of the reproduction control circuit 201 of the first exemplary embodiment, when the reproduction control circuit 301 is input with the second selection information, the reproduction control circuit 301 references the sound source memory 307 and outputs a second sound source selection signal to the sound source memory 307. The second sound source selection signal includes an instruction to output a sound source signal (namely, a second sound source signal) corresponding to the second selection information to the second sound source generator 308.

Detailed explanation follows regarding functionality of the background sound generation section 16. The background sound generation section 16 includes a sound source control circuit 306, the sound source memory 307, a first sound source generator 208, a level measurement device 209, a second volume adjuster 210, the second sound source generator 308, and a third volume adjuster 310. The functionality of the first sound source generator 208, the level measurement device 209, and the second volume adjuster 210 is similar to that of the first exemplary embodiment, and so explanation thereof is omitted.

In addition to the information stored in the sound source memory 207 of the first exemplary embodiment, the sound source memory 307 is also stored with sound source signals employed for the second background sound, and IDs thereof. In addition to having the functionality of the sound source memory 207 of the first exemplary embodiment, the sound source memory 307 also outputs the second sound source signal based on the second sound source selection signal to the second sound source generator 308.

The second sound source generator 308 outputs a sound signal (referred to hereafter as the second sound signal) reproduced from the second sound source signal to the third volume adjuster 310. The third volume adjuster 310 outputs the second sound signal to a second synthesizer 313 as the second background sound.

Note that as illustrated by dashed lines in FIG. 10, in addition to having the functionality of the sound source control circuit 206 of the first exemplary embodiment, the sound source control circuit 306 may also output a second sound source generation signal including an instruction to adjust the frequency of the second sound source signal to the second sound source generator 308. In such cases, the second sound source generator 308 may be configured to adjust the frequency of the second sound signal based on the second sound source generation signal and output a frequency-adjusted sound signal as the second sound signal. For example, similarly to the sound source generation signal, the frequency of the second sound source signal may be adjusted to a frequency scaling factor of n times.

Further, as illustrated by dashed lines in FIG. 10, the sound source control circuit 306 may output a third volume control signal to the third volume adjuster 310. The third volume control signal includes an instruction to adjust the volume of the second sound signal. In such cases, the third volume adjuster 310 may be configured to adjust the volume of the second sound signal based on the third volume control signal, and output a volume-adjusted second sound signal as the second background sound. For example, similarly to the second volume control signal, the volume of the second sound signal may be adjusted to within a range that does not exceed the volume Lmax. Alternatively, for example, the volume of the second background sound may be adjusted such that the warning sound and the first background sound do not become inaudible.

Detailed explanation follows regarding functionality of the second synthesizer section 15. The second synthesizer section 15 includes the second synthesizer 313 and a second amplifier 312. The second synthesizer 313 combines the warning sound, the first background sound, and the second background sound, and outputs the combination to the second amplifier 312 as the second advisory sound. The second amplifier 312 outputs the second advisory sound to the second speaker 6.

As described above, the sound output device 5 according to the present exemplary embodiment generates the warning sound that includes at least one sine wave, and generates the volume-adjusted first background sound and generates the second background sound based on the selected sound sources. Generating and outputting sounds that can be freely modified by the user and a sound that cannot be modified by the user enables a sound adapted to suit the tastes of the user to be output while also taking safety into account.

Note that in cases in which the second advisory sound meets conditions stipulated by restrictions and regulations, the second speaker 6 may be employed to output audio to the vehicle exterior.

Note that although explanation has been given regarding configurations in which the advisory sound generation processing program 25, the speed-based control information memory 202, and the sound source memory 207, 307 are stored in advance (installed) in the storage section 22 in the exemplary embodiments described above, there is no limitation thereto. The advisory sound generation processing program 25, the speed-based control information memory 202, and the sound source memory 207, 307 may be provided in a format recorded on a recording medium such as Compact Disc Read Only Memory (CD-ROM), Digital Versatile Disc Read Only Memory (DVD-ROM), Universal Serial Bus (USB) memory, or the like. Alternatively, the advisory sound generation processing program 25, the speed-based control information memory 202, and the sound source memory 207 may be downloaded from an external device via a network.

What is claimed is:

1. A sound output device for installation at a vehicle, the sound output device comprising:
    a warning sound generation section configured to generate a warning sound including at least one sine wave;
    a controller configured to control selection of a sound source of a first background sound based on externally-supplied selection information;
    a background sound generation section configured to generate a volume-adjusted first background sound based on the selected sound source; and
    a first synthesizer section configured to combine the warning sound and the volume-adjusted first background sound to provide a combined sound, and to output the combined sound as a first advisory sound,
    wherein the background sound generation section comprises
        a level measurement device configured to measure a level of a sound source signal configuring the selected sound source of the first background sound, and
        a volume adjuster configured to adjust a volume of the first background sound so as not to exceed a predetermined maximum volume to provide the volume-adjusted first background sound, and
    wherein the volume adjuster is configured to adjust the volume of the first background sound such that a variation in the level of the sound source signal configuring the selected sound source of the first background sound is adjusted based on a measurement result of the level measurement device.

2. The sound output device of claim 1, wherein
    the background sound generation section comprises a sound source memory storing at least one sound source signal configuring a sound source of the first background sound, and
    the controller is configured to control selection of one sound source signal from among the at least one sound source signal stored in the sound source memory as the selected sound source based on the selection information.

3. The sound output device of claim 1, wherein
    the background sound generation section is further configured to generate a second background sound; and
    the sound output device further comprises a second synthesizer section configured to combine the warning sound, the volume-adjusted first background sound, and the second background sound to provide a second combined signal, and to output the second combined signal as a second advisory sound.

4. A sound output system comprising:
    the sound output device of claim 3;
    a first speaker input with the first advisory sound; and
    a second speaker input with the second advisory sound.

5. A sound output system comprising:
    the sound output device of claim 1; and
    a speaker input with the first advisory sound.

6. A sound output device for installation at a vehicle, the sound output device comprising:
    a warning sound generation section configured to generate a warning sound including at least one sine wave;
    a controller configured to control selection of a sound source of a first background sound based on externally-supplied selection information;
    a background sound generation section configured to generate a volume-adjusted first background sound based on the selected sound source; and
    a first synthesizer section configured to combine the warning sound and the volume-adjusted first background sound to provide a combined sound, and to output the combined sound as a first advisory sound,
    wherein the controller is configured to supply a sine wave control signal that includes instructions relating to a frequency of the at least one sine wave included in the warning sound and relating to a volume of the warning sound and that is based on speed information representing a speed of the vehicle to the warning sound generation section, and is also configured to supply a sound source control signal that includes instructions relating to a frequency and a volume of the first background sound and that is based on the speed information to the background sound generation section,
    wherein the warning sound generation section comprises
        a sine wave control circuit configured to output a sine wave generation signal including an instruction to generate a sine wave at a frequency instructed by the sine wave control signal and also to output a first volume control signal including an instruction relating to a volume of the warning sound as instructed by the sine wave control signal,
        a sine wave generator configured to output the sine wave based on the sine wave generation signal, and
        a first volume adjuster configured to adjust the volume of the warning sound based on the first volume control signal, and
    wherein the background sound generation section comprises
        a sound source control circuit configured to output a sound source generation signal including an instruction to generate the first background sound at a frequency instructed by the sound source control signal and also to output a second volume control signal including an instruction to generate the first background sound at a volume instructed by the sound source control signal,
        a first sound source generator configured to adjust a frequency of the first background sound based on the sound source generation signal, and
        a second volume adjuster configured to adjust a volume of the first background sound so as not to exceed a predetermined maximum volume to provide the volume-adjusted first background sound,
    wherein the second volume adjuster is configured to adjust the volume of the first background sound based on the second volume control signal.

* * * * *